June 24, 1930.　　　　　R. C. PIERCE　　　　　1,767,772
TIRE BEAD REENFORCING ELEMENT
Filed March 13, 1929
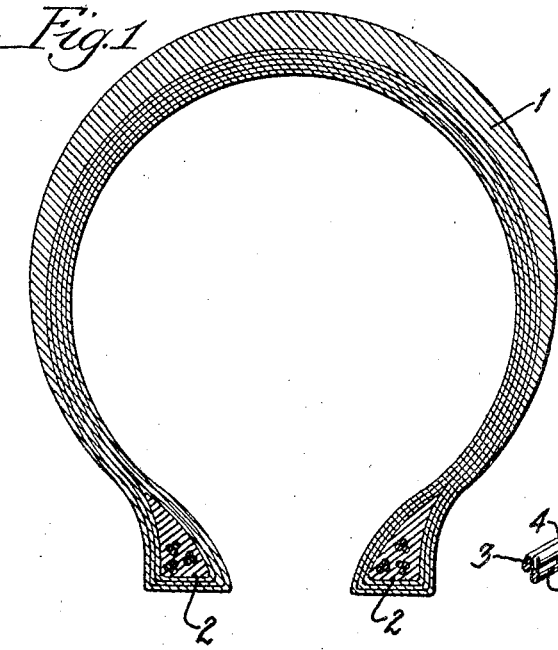
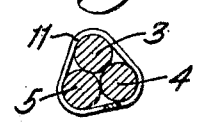
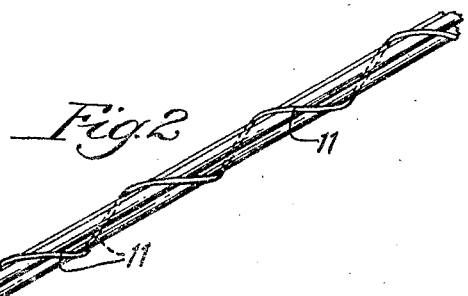
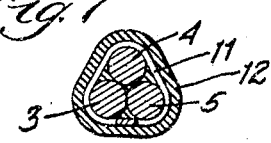
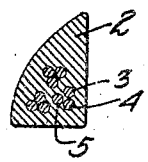
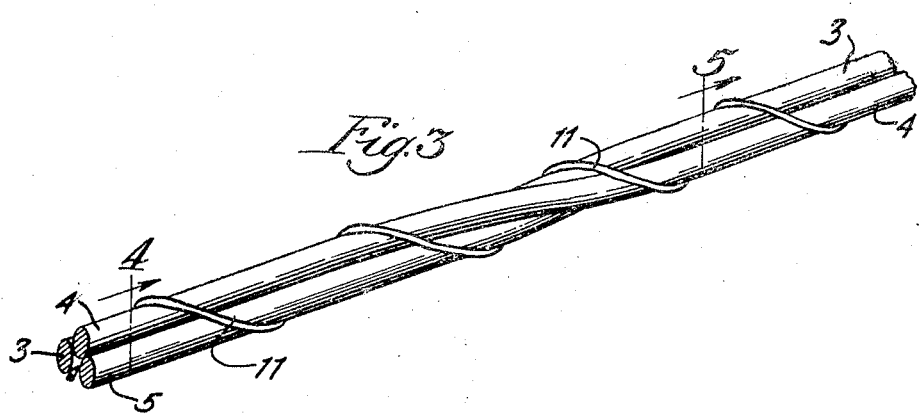
Inventor:
Robert C. Pierce,
By Dyrenforth, Lee, Chritton & Wiles,
Att'ys.

Patented June 24, 1930

1,767,772

UNITED STATES PATENT OFFICE

ROBERT C. PIERCE, OF NILES, MICHIGAN, ASSIGNOR TO NATIONAL STANDARD COMPANY, A CORPORATION OF MICHIGAN

TIRE-BEAD REENFORCING ELEMENT

Application filed March 13, 1929. Serial No. 346,642.

This invention relates to improvements in tirebead reenforcing elements, and more especially to such an element adapted for use in a bead of a casing for a pneumatic tire.

Among the features of my invention is the provision of a reenforcement, or reenforcing element, which may be easily and cheaply manufactured and which is substantially non-stretchable. The reenforcing element also may be wound into a convolution without placing undue stress upon the individual strands or tension members.

My improved reenforcing element is also so constructed that in the forming of a bead, the reenforcing element will become embedded in and interlocked with the rubber compound of which the bead is made, thus forming practically a unitary structure.

In drum built tires, the bead has a tendency to turn when the tire is moved from the drum and expanded. My improved reenforcing element is so made that the individual tension members thereof are permitted a certain amount of relative movement with respect to each other, thus permitting the necessary adjustment of the element in the bead as the bead is turned when the tire is removed from the drum, without loosening the element in the bead.

Other features and advantages of my invention will appear more fully as I proceed with my specification.

In that form of device embodying the features of my invention shown in the accompanying drawings, Figure 1 is a vertical sectional view of a tire with a bead in which is the improved reenforcing element;

Figs. 2 and 3 are views in perspective of portions of the elements;

Figs. 4 and 5 are sectional views taken as indicated by the lines 4 and 5 of Fig. 3;

Fig. 6 is a sectional view of a bead of a tire showing my improved reenforcing element embedded therein; and Fig. 7 is a sectional view of the reenforcing element showing the same embedded in rubber compound.

As shown in the drawings, 1 indicates a conventional tire casing provided with the usual bead 2, which is formed of a suitable rubber composition, the bead being of a cross-section corresponding to the tire in which it is desired to use the same.

I shall now describe the reenforcement or reenforcing element. This includes a plurality of tension members here shown, for example, as three initially separate wires 3, 4 and 5. The tension members are held together by a thin flexible retaining strand 11 separate from these members and spirally wound about them. The strand 11, for example, may be of thin wire. The three tension members 3, 4 and 5 are held in substantially parallel adjacent relationship; but it is to be particularly noted that relative movement between the tension members 3, 4 and 5 is permitted inside of the retaining strand 11. I have attempted to indicate this possible twisting of relative positions of the tension members by the sectional views 4 and 5 of Fig. 3, showing that the three wires 3, 4 and 5 are not always exactly parallel as shown in Fig. 2 throughout the length of the element, but are permitted to roll or shift, one above the other so that their relative positions in different sections of the element will be different. This shifting of the tension members, or relative movement between the same which is permitted inside of the retaining strand 11, prevents the element from becoming unduly loosened in the bead as the bead is turned or rolled in different places during the formation or building up of the tire.

In using the element in the tire, the same is convolutively disposed in the tire bead, and thus without the ends connected, as many turns as desired being formed. In making my bead, for example, there may be three wraps or convolutions of the element as shown in the drawings. If desired, these wraps may be made on the mandrel or form or drum as the bead is being made up, or the element may be so disposed apart from the bead and formed into a completed annulus which is inserted in the bead as the same is formed.

If desired, the element before being put into the tire bead may be impregnated or coated with a suitable rubber compound 12 as shown in Fig. 7.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

I claim:

A tire bead reinforcing element comprising a plurality of initially separate and substantially parallel tension strands, a retaining strand separate from the first mentioned strands and wound spirally about the same, said element with its ends unconnected being adapted for winding in a tire bead, whereby maximum relative movement between the tension strands is permitted inside of the retaining strand to prevent the element from becoming unduly loosened in the bead as the latter is turned in different places during the building of a tire.

In testimony whereof, I have hereunto set my hand this 28th day of February, 1929.

ROBERT C. PIERCE.